O. HASELAU.
COOKING UTENSIL.
APPLICATION FILED APR. 4, 1917.

1,277,579. Patented Sept. 3, 1918.

WITNESSES:

INVENTOR
Otto Haselau

UNITED STATES PATENT OFFICE.

OTTO HASELAU, OF LONG ISLAND CITY, NEW YORK.

COOKING UTENSIL.

1,277,579.      Specification of Letters Patent.      Patented Sept. 3, 1918.

Application filed April 4, 1917. Serial No. 159,710.

*To all whom it may concern:*

Be it known that I, OTTO HASELAU, a citizen of the United States of America, residing in Long Island City, county of Queens, and State of New York, have invented a certain new and useful Cooking Utensil for the Baking of Potatoes, of which the following is a specification.

The invention relates to an improved cooking utensil and one which is especially adapted for baking potatoes or the like, although it may have other uses. The main object of the invention is to provide a utensil by means of which potatoes or the like may be more evenly, quickly and efficiently cooked, especially on top of a stove. Further and more specific objects, features and advantages will more clearly appear from the detailed description given below, taken in connection with the accompanying drawing, which forms a part of this specification.

In the accompanying drawing.

Figure 1:
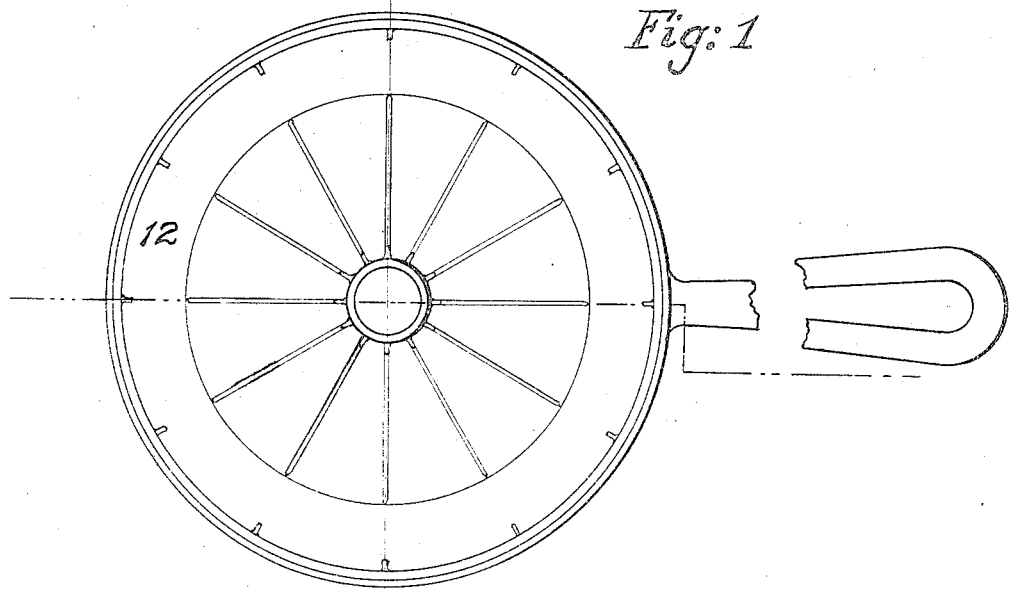
Figure 1 shows a plan view of the baking pot with the cover removed.
Figure 2:
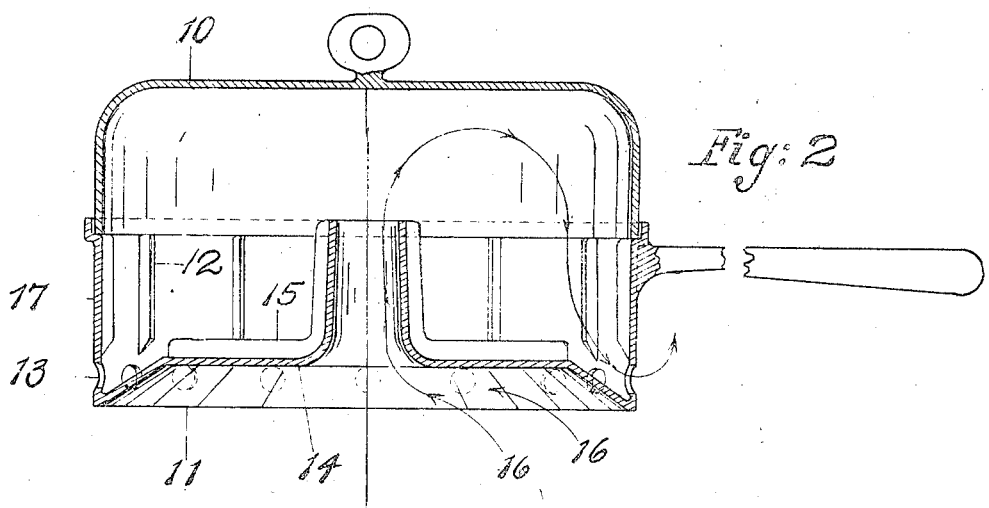
Fig. 2 is a vertical longitudinal section of the baking pot with the cover in place.

Referring to Fig. 2, the main (lower) body 11, with the cover (upper) body 10 in place, forms a container into which the potatoes are placed. The potatoes do not lie directly upon the bottom 14 but rest upon the ribs 15, which extend upward from the bottom. The surrounding wall 17 of body 11 has on its inner side vertical ribs 12. The ribs 12 and 15 are intended to provide circulating space for the heat by making it impossible for the potatoes to lie solidly against the wall 17 or the bottom 14, as this would not permit the hot gases to circulate so freely, and also would cause the potatoes to burn on the side that is in close contact with the bottom 14 or the wall 17.

The bottom 14 is raised and fastened to the surrounding wall 17 by slanting the outer periphery downward till it meets the bottom edge of wall 17. The object of raising the bottom is to form a space for collecting the hot gases rising from below, as indicated by arrows 16, and to guide the hot gases along the bottom and through the opening in the upward extended portion, up into the space containing the potatoes, passing around these and down, to be guided by the slanting bottom 14, out through the vent holes 13, into free space. In other words, the bottom is designed in such a way as to afford the least resistance to the heat waves, and also, by its slanting edge, permits locating the vent holes 13 at the lowest part of wall 17. This in turn permits the keeping down of the height of wall 17. A straight bottom would have caused resistance and made the baking pot higher.

From the construction it can be seen that the vent holes 13 are located on a lower level than the bottom of the potatoes resting upon the ribs 15. This is essential, as a higher location of the vent holes 13 causes the potatoes to remain raw on places nearest the vent holes 13. In other words, the potatoes, to be baked most uniformly, must be lying in a medium of uniform heat.

One of the principal reasons for inventing this baking pot is to afford everybody an easy means of baking potatoes for every meal when desired without starting a large bake oven, involving considerable expense in consumption of gas, and in the summer also overheating the kitchen and the house. While my baking pot is used the same as an ordinary pot on top of a gas range, the consumption of gas is lower than for boiling potatoes in water, as the heat in my baking pot is utilized to a greater advantage by being guided through the pot before expelling, while in ordinary boiling pots only the bottom is exposed to the heat waves.

While I have described my improvements in detail and with respect to one embodiment thereof, I do not desire to be limited to such details, as many changes and modifications may well be made without departing from the spirit and scope of the invention in its broader aspects. Hence, it is intended to cover all forms and modifications coming within the language of the appended claims.

What I claim as new and desire to secure by Letters Patent, is:

1. A cooking utensil having an upwardly extending passageway through which rising hot gases are caused to flow upwardly through the material being cooked, a top portion and side walls deflecting said hot gases, after they leave said passageway, down around the material being cooked, to bring about a more even and rapid cooking thereof, and exit passageways for the gases after they have passed down around the material being cooked.

2. A cooking utensil having a central upwardly extending passageway through the material being cooked and through which rising hot gases are caused to flow upwardly, a cover acting to deflect said hot gases, after they leave said passageway, down around the material being cooked, and exit passageways for the gases, below the top of said first mentioned passageway.

3. A cooking utensil having passageways directing hot gases to enter the utensil and pass upwardly and downwardly therein and over the material therein to be cooked, and when flowing in one direction, to pass around the material being cooked, and when flowing in the other direction, to pass through the material being cooked, and outlet means for the hot gases adjacent the bottom of the utensil, part of the utensil being removable to form a removable cover therefor.

4. A cooking utensil having a passageway extending upwardly from the bottom and through the material being cooked, and a top portion and side walls deflecting the hot gases after they leave said passageway, down around the material being cooked to bring about a more rapid and even cooking thereof.

5. A cooking utensil having a raised bottom for collecting rising hot gases, a passageway communicating with the space below said bottom and extending upwardly through the material being cooked to cause rising hot gases to flow from below said bottom up through the material being cooked, and a top portion and side walls deflecting the gases, after they leave said passageway down around the material being cooked, and exit passageways for the gases after they have passed down around the material being cooked.

6. A cooking utensil having a raised bottom for collecting rising hot gases, a passageway communicating with the space below said bottom and directing hot gases to enter the utensil and pass upwardly and downwardly therein and over the material therein to be cooked, and when flowing in one direction, to pass around the material being cooked, and when flowing in the other direction, to pass through the material being cooked, and outlet means for the hot gases adjacent the bottom of the utensil, part of the utensil being removable to form a removable cover therefor.

7. A cooking utensil having a raised bottom for collecting rising hot gases, a passageway communicating with the space below said bottom and directing hot gases to enter the utensil and pass upwardly and downwardly therein and over the material therein to be cooked, and when flowing in one direction, to pass around the material being cooked, and when flowing in the other direction, to pass through the material being cooked, and outlet means for the hot gases adjacent the bottom of the utensil, part of the utensil being removable to form a removable cover therefor, the bottom of the utensil being provided with upwardly extending projections on which the material being cooked is adapted to rest to space the same from the bottom of the utensil.

8. A cooking utensil having a passageway extending upwardly from the bottom and through the material being cooked, and a top portion and side walls deflecting the hot gases after they leave said passageway, down around the material being cooked to bring about a more rapid and even cooking thereof, the bottom of the utensil being provided with means for spacing the material being cooked from the bottom of the utensil.

9. A cooking utensil having a passageway extending upwardly from the bottom and through the material being cooked, and a top portion and side walls deflecting the hot gases after they leave said passageway, down around the material being cooked, to bring about a more rapid and even cooking thereof, and exit vent holes substantially uniformly spaced about the bottom portion of the utensil.

10. A cooking utensil comprising a body portion and a cover, the bottom of the body portion being raised and having a surrounding depending part to restrain the lateral outward flow of hot gases, a passageway communicating with the space below said bottom and causing the hot gases to flow upwardly through the material being cooked, a top portion and side walls deflecting the hot gases leaving said passageway, down around the material being cooked, and vent holes for said gases, distributed about the lower part of the utensil below the bottom of the material being cooked.

In witness whereof I have hereunto subscribed my name.

OTTO HASELAU.